(12) United States Patent
Kim et al.

(10) Patent No.: US 7,575,824 B2
(45) Date of Patent: Aug. 18, 2009

(54) METHOD OF IMPROVING FUEL CELL PERFORMANCE BY REMOVING AT LEAST ONE METAL OXIDE CONTAMINANT FROM A FUEL CELL ELECTRODE

(75) Inventors: Yu Seung Kim, Los Alamos, NM (US); Jong-Ho Choi, Los Alamos, NM (US); Piotr Zelenay, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 231 days.

(21) Appl. No.: 11/493,259

(22) Filed: Jul. 26, 2006

(65) Prior Publication Data

US 2008/0026262 A1 Jan. 31, 2008

(51) Int. Cl.
*H01M 8/00* (2006.01)
*C25F 7/00* (2006.01)
(52) U.S. Cl. .................................. 429/13; 205/704
(58) Field of Classification Search .................. 429/13; 205/704
See application file for complete search history.

(56) References Cited

U.S. PATENT DOCUMENTS

| | | | |
|---|---|---|---|
| 4,407,906 A | 10/1983 | Stonehart | |
| 6,007,934 A | 12/1999 | Auer et al. | |
| 6,797,667 B2 | 9/2004 | Ruth et al. | |
| 6,911,278 B2 | 6/2005 | Hiroshima et al. | |
| 2005/0123809 A1* | 6/2005 | Saunders et al. | 429/13 |
| 2006/0042957 A1* | 3/2006 | He | 205/687 |
| 2006/0134507 A1 | 6/2006 | Park et al. | |
| 2007/0026290 A1* | 2/2007 | AlexandrovichSerov et al. | 429/40 |

OTHER PUBLICATIONS

Piela et al., Ruthenium Crossover in direct Methanol Fuel Cell with Pt-Ru Black Anode, Journal of The Electrochemical Society, 151 (12) A2053-A2059 (2004).
Wang, "Recent Development of Non-Platinum Catalysts for Oxygen Reduction Reaction," Journal of Power Sources 152 (2005) 1-15.
Gasteiger et al., "Activity Benchmarks and Requirements for Pt, Pt-Alloy, and Non-Pt Oxygen Reduction catalysts for PEMFCs," Applied Catalysis B: Environmental 56 (2005) 9-35.
Attwood et al., "The Electrocatalytic Oxidation of Methanol in Acid Electrolyte: Preparation and characterization of Noble Metal Electrocatalysts Supported on Pre-Treated Carbon-Fiber Papers," Journal of Applied electrochemistry 10 (1980) 213-222.

* cited by examiner

*Primary Examiner*—Mark Ruthkosky
*Assistant Examiner*—Karie O'Neill
(74) *Attorney, Agent, or Firm*—Robert P. Santandrea; Juliet A. Jones

(57) ABSTRACT

A method of removing contaminants from a fuel cell catalyst electrode. The method includes providing a getter electrode and a fuel cell catalyst electrode having at least one contaminant to a bath and applying a voltage sufficient to drive the contaminant from the fuel cell catalyst electrode to the getter electrode. Methods of removing contaminants from a membrane electrode assembly of a fuel cell and of improving performance of a fuel cell are also provided.

27 Claims, 14 Drawing Sheets

METHOD OF IMPROVING FUEL CELL PERFORMANCE BY REMOVING AT LEAST ONE METAL OXIDE CONTAMINANT FROM A FUEL CELL ELECTRODE

STATEMENT REGARDING FEDERAL RIGHTS

This invention was made with government support under Contract No. DE-AC 52-06 NA 25396, awarded by the U.S. Department of Energy. The government has certain rights in the invention.

BACKGROUND OF INVENTION

The invention relates to fuel cells. More particularly, the invention relates to fuel cell catalyst electrodes. Even more particularly, the invention relates to methods of cleaning such catalyst electrodes.

Polymer electrolyte fuel cells (PEFCs), including direct methanol fuel cells (DMFCs), have attracted great interest as an alternative power source for vehicles and portable electronic devices. Two major challenges facing PEFCs are the reduction of material costs and the need for improved performance. Regarding the former challenge, non-platinum catalysts based on metals such as ruthenium, palladium, iron, manganese, cobalt nickel, chromium, molybdenum, and vanadium have been investigated.

Regarding the latter challenge, it has been recognized that the presence of some metallic oxides tend to contaminate cathode catalyst layers, leading to a decrease in oxygen reduction reaction (ORR) activity in such cathodes and a corresponding reduction in fuel cell performance. In some instances, metallic species may migrate from one electrode to the other under fuel cell operating conditions and in the presence of a contaminated oxidation/reduction catalyst.

Methods of removing such contaminants have included treatment of the catalytic electrode material with acids ranging from organic carboxylic acids to dilute sulfuric acid. Such treatment appears to yield varying results: the process is either incomplete, if mild treatment conditions are used, or results in significant loss of metal if conditions are too harsh.

While oxide contaminants on fuel cell electrodes adversely affect fuel cell performance, methods of removing such materials are highly variable and may result in loss of electrode material. Therefore, what is needed is a method of removing such contaminants from a fuel cell catalyst material. What is also needed is a method of removing such contaminants in situ from a membrane electrode assembly. In addition, what is needed is a method of improving fuel cell performance based on the removal of such contaminants.

SUMMARY OF INVENTION

The present invention meets these and other needs by providing a method of removing contaminants from a fuel cell catalyst electrode. The method includes providing a getter electrode and a fuel cell catalyst electrode having at least one contaminant and applying a voltage sufficient to drive the contaminant from the fuel cell catalyst electrode through an electrolyte to the getter electrode. Methods of removing contaminants from a membrane electrode assembly of a fuel cell and of improving performance of a fuel cell are also provided.

Accordingly, one aspect of the invention is to provide a method of removing at least one contaminant from a fuel cell catalyst electrode. The method comprises the steps of: providing the fuel cell catalyst electrode including the at least one contaminant; providing a getter electrode, wherein the getter electrode is electrically connected to the fuel cell electrode; contacting the fuel cell catalyst electrode and the getter electrode with an electrolyte; providing a voltage across the fuel cell electrode and the getter electrode, wherein the voltage is sufficient to drive the at least one contaminant from the fuel cell electrode through the electrolyte to the getter electrode, thereby removing the at least one contaminant from the fuel cell electrode.

A second aspect of the invention is to provide a method of removing at least one contaminant from a membrane electrode assembly of a fuel cell in situ. The method comprising the steps of: providing a membrane electrode assembly to the fuel cell, wherein the membrane electrode assembly comprises a fuel cell electrode that includes the at least one contaminant and one of a platinum alloy, at least one transition metal, and a cathode catalyst comprising at least one transition metal and at least one chalcogen; providing a getter electrode to the fuel cell, wherein the getter electrode is electrically connected to the fuel cell electrode; contacting the fuel cell electrode and the getter electrode to a proton exchange membrane; and providing a voltage across the fuel cell electrode and the getter electrode, wherein the voltage is sufficient to drive the at least one contaminant from the fuel cell electrode through the proton exchange membrane to the getter electrode, thereby removing the at least one contaminant from the fuel cell electrode.

A third aspect of the invention is to provide a method of improving fuel cell performance. The method comprises the steps of: providing a membrane electrode assembly to the fuel cell, the membrane electrode assembly comprising the membrane electrode assembly comprising a fuel cell electrode, the fuel cell electrode comprising the at least one contaminant and one of a platinum alloy, at least one transition metal, and a cathode catalyst comprising at least one transition metal and at least one chalcogen; providing a getter electrode to the fuel cell, wherein the getter electrode is electrically connected to the fuel cell electrode; contacting the fuel cell electrode and the getter electrode to a proton exchange membrane; and providing a voltage across the fuel cell electrode and the getter electrode, wherein the voltage is sufficient to drive the at least one contaminant from the fuel cell electrode through the proton exchange membrane to the getter electrode, thereby removing the at least one contaminant from the fuel cell electrode, and wherein removing the at least one contaminant from the fuel cell electrode improves fuel cell performance.

These and other aspects, advantages, and salient features of the present invention will become apparent from the following detailed description, the accompanying drawings, and the appended claims.

DETAILED DESCRIPTION

Figure 1:
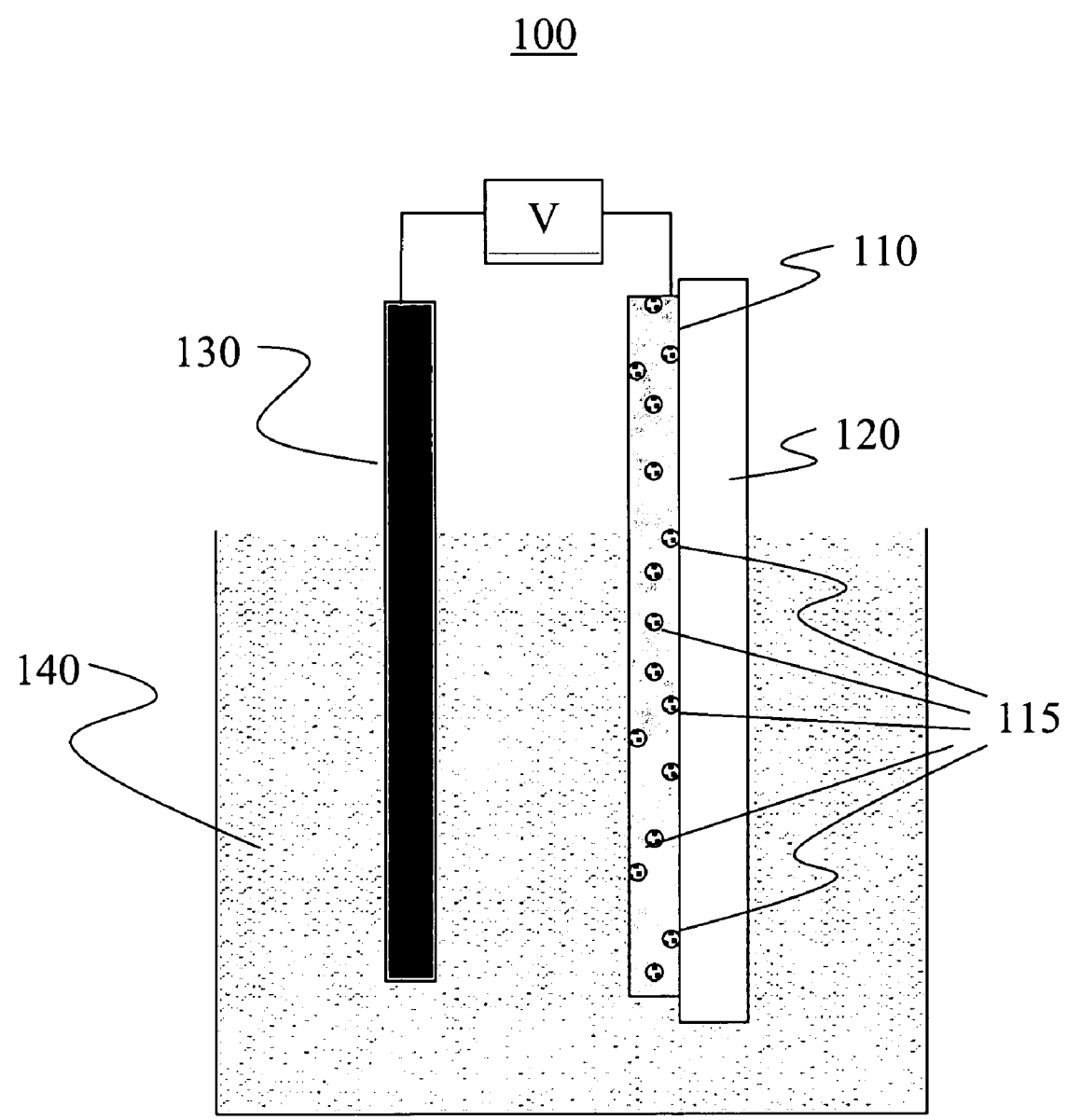
FIG. 1 is a schematic representation of a configuration for carrying out a method of removing at least one contaminant from a fuel cell catalyst electrode.

In the following description, like reference characters designate like or corresponding parts throughout the several views shown in the figures. It is also understood that terms such as "top," "bottom," "outward," "inward," and the like are words of convenience and are not to be construed as limiting terms. In addition, whenever a group is described as either comprising or consisting of at least one of a group of elements and combinations thereof, it is understood that the group may comprise or consist of any number of those elements recited, either individually or in combination with each other.

Referring to the drawings in general and to FIG. 1 in particular, it will be understood that the illustrations are for the purpose of describing a particular embodiment of the invention and are not intended to limit the invention thereto. Turning to FIG. 1, one possible configuration for carrying out a method of removing at least one contaminant from a fuel cell catalyst electrode is schematically shown. Configuration 100 includes a getter electrode 130 and a fuel cell catalyst electrode 110 that are electrically connected to each other and at least partially immersed in an electrolyte bath 140. In one embodiment, bath 140 is either an aqueous bath or an ionic bath such as, for example, dilute sulfuric acid, perchloric acid, trifluoromethanesulfonic acid, phosphoric acid, and the like. In another embodiment, fuel cell catalyst 110 and getter electrode 130 are each brought into physical contact with a solid electrolyte. Fuel cell catalyst electrode 110 includes at least one contaminant 115. The at least one contaminant 115 is intermixed with fuel cell catalyst 110. In the embodiment shown in FIG. 1, fuel cell catalyst electrode 110 is disposed upon a surface of substrate 120, which provides mechanical support for fuel cell catalyst electrode 110. In this embodiment, substrate 120 may comprise Teflon®, carbon cloth, carbon paper, or an ionomeric membrane such as, but not limited to Nafion® and the like. A voltage V is provided between fuel cell catalyst electrode 110 and getter electrode 130. Voltage V is sufficient to drive contaminant from fuel cell catalyst electrode 110 to getter electrode 130. Voltage V drives the at least one contaminant through electrolyte bath 140 (or, in other embodiments, through a solid electrolyte) to getter electrode 130, where it is captured. In the embodiment shown in FIG. 1, fuel cell catalyst electrode 110 may be either a fuel cell anode or cathode. Getter electrode 130 may be an electrode not intended for use in a fuel cell, and may be a disposable electrode or an electrode that may otherwise be regenerated for further use.

Figure 2A:
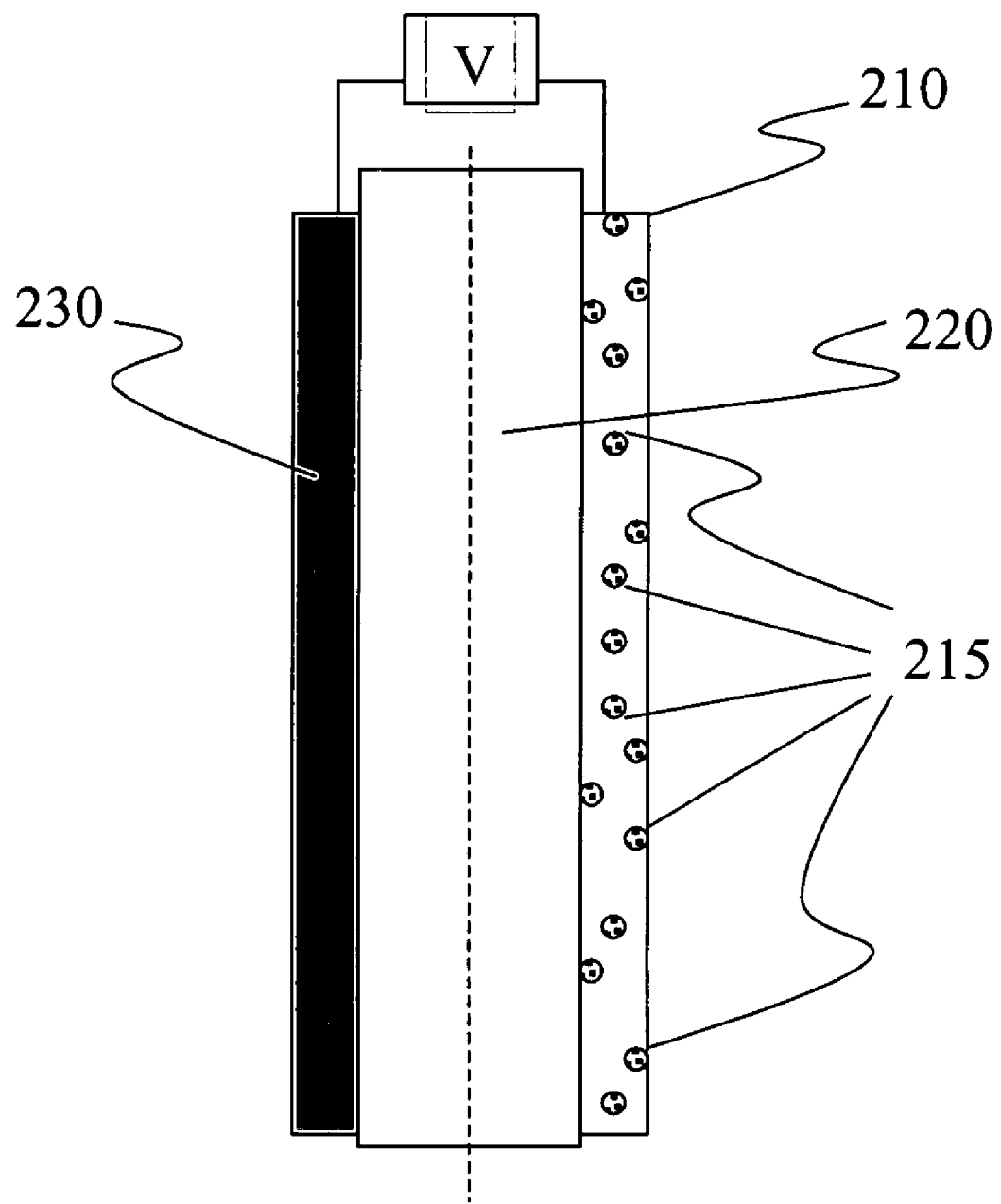
FIG. 2a is a schematic representation of a second configuration for carrying out a method of removing at least one contaminant from fuel cell catalyst electrode of a fuel cell membrane electrode assembly (MEA)
Figure 2B:
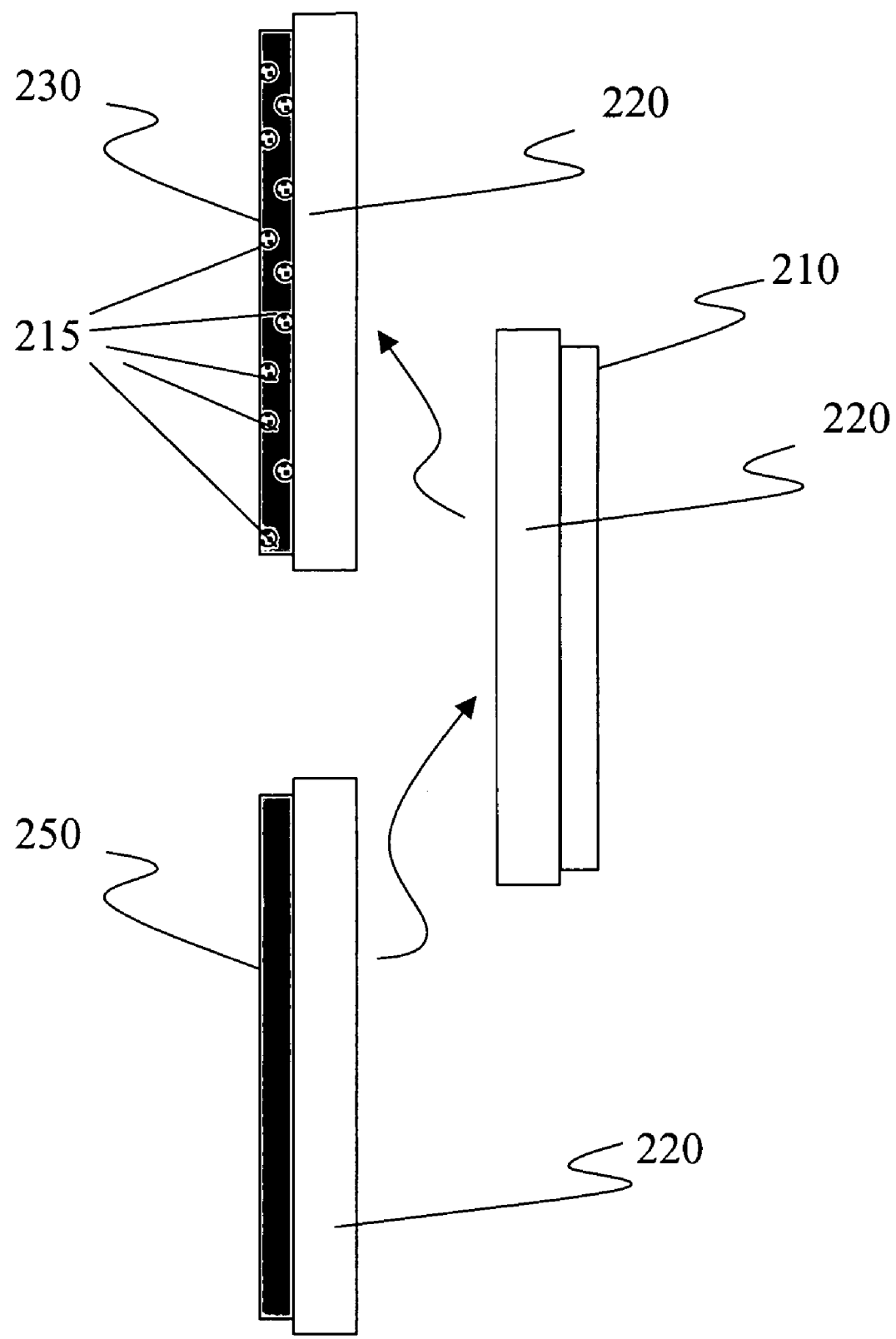
FIG. 2b is a schematic representation showing the removal and replacement of the getter electrode shown in FIG. 2a with a cathode catalyst.

In a second embodiment, shown in FIG. 2a, the fuel cell catalyst electrode forms a portion of a membrane electrode assembly (also referred to herein as "MEA") 205. MEA 205 includes an anode catalyst electrode 210 having at least one contaminant 215. Anode catalyst electrode 210 is disposed on substrate 220. Getter electrode 230 is disposed on substrate 220 as well, such that substrate 220 separates the two electrodes. Substrate 220 is a proton exchange membrane (also referred to hereinafter as "PEM") comprising a solid electrolyte. Anode 210 is electrically connected to getter electrode 230, and a voltage V is provided between anode 210 and getter electrode 230. Voltage V is sufficient to drive the at least one contaminant 215 from anode 210 through the PEM to getter electrode 230. Getter electrode 230 is typically not intended for use in a fuel cell, and may be a disposable electrode or an electrode that may otherwise be regenerated for further use. After removal of the at least one contaminant 215 from anode 210, getter electrode is typically removed from MEA 205 and replaced with a cathode 250, as shown in FIG. 2b. In this embodiment, anode 210 and cathode 250 are disposed on separate substrates and subsequently combined to form MEA 205. In one embodiment, at least one of getter electrode 230, cathode, 250, and anode 210 is disposed on a gas diffusion layer (also referred to herein as "GDL") comprising carbon cloth or carbon paper, and then brought into contact with substrate 220.

Figure 3:
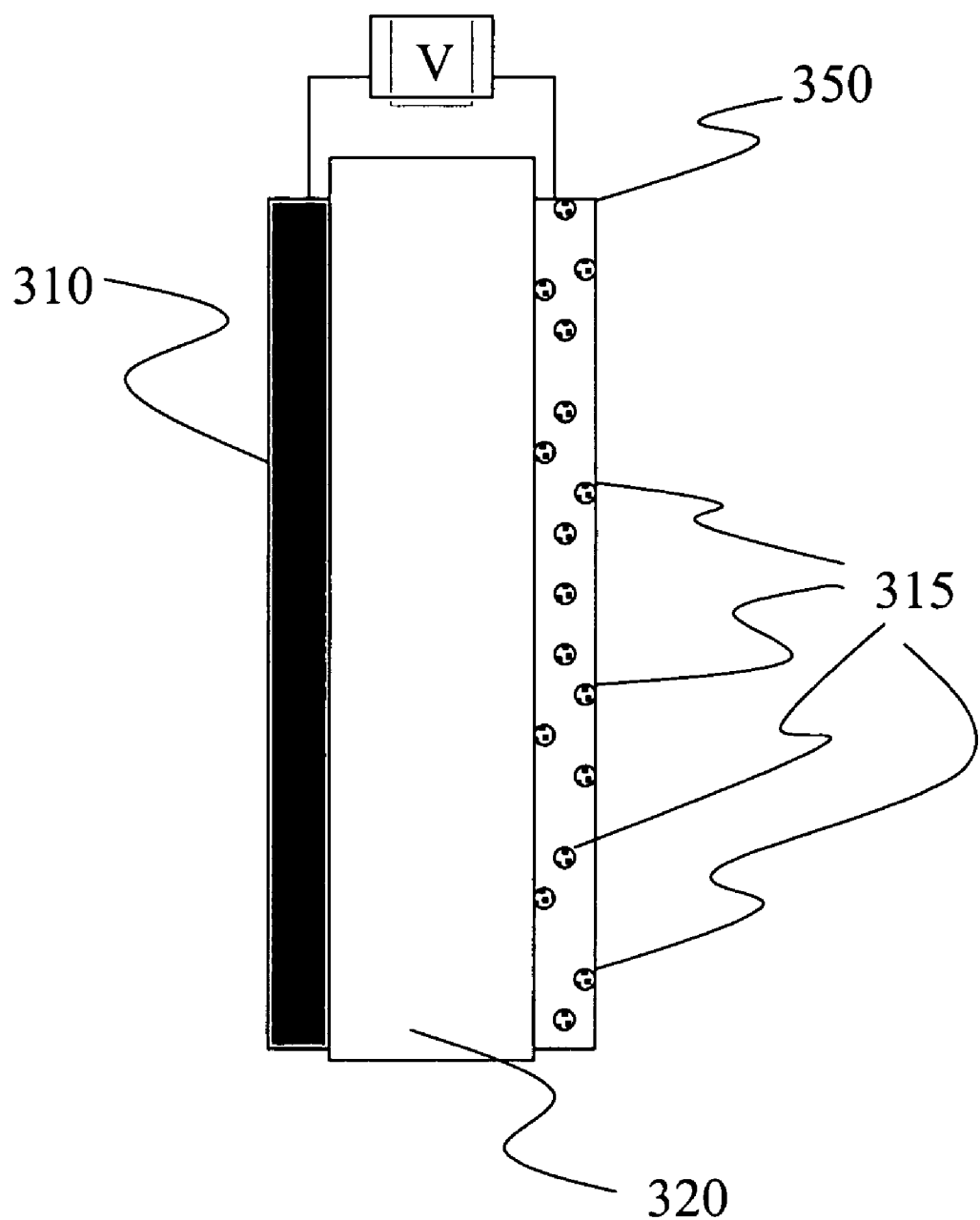
FIG. 3 is a schematic representation of a third configuration for carrying out a method of removing at least one contaminant from a fuel cell catalyst electrode of a MEA.

FIG. 3 is a schematic representation of a third configuration in which anode 310 serves as the getter electrode for cathode 350 having at least one contaminant 315. Both anode 310 and cathode 350 are disposed on substrate 320, which is a PEM. To remove the at least one contaminant 315 from cathode 350, anode 310 is electrically connected to cathode 350, and a voltage V, which is sufficient to drive contaminant from cathode 350 through the PEM to anode 310 is provided between cathode 350 and anode 310. As seen in FIG. 3, anode 310 and cathode 350 are disposed on substrate is 320 to form MEA 305. Alternatively, anode 310 and cathode 350 may each be disposed on separate substrates (not shown), and the separate substrates are subsequently combined to form MEA 305. After the least one contaminant 215 has been removed from cathode 350, anode 310 which served as the getter electrode may be replaced with a fresh, uncontaminated anode.

The fuel cell may be a polymer electrolyte fuel cell such as, but not limited to, a direct methanol fuel cell, a neat hydrogen fuel cell, a reformed hydrogen fuel cell, and the like.

The composition of fuel cell catalyst electrode 110 depends on whether the fuel cell catalyst electrode 110 is an anode or a cathode. Where fuel cell catalyst electrode 110 is an anode, it may comprise platinum, or platinum alloys such as, but not limited to platinum/ruthenium alloys, platinum/nickel alloys, platinum/chromium alloys, and the like. The cathode may comprise at least one transition metal such as ruthenium, iron, chromium, cobalt, molybdenum, manganese, magnesium, nickel, osmium, rhodium, tungsten, rhenium, yttrium, titanium, and combinations thereof. Alternatively, cathode 350 may comprise platinum, gold, iridium, palladium, or a platinum alloy such as, but not limited to, platinum/chromium, platinum/cobalt and platinum/iron alloys.

In another embodiment, cathode 350 comprises a cathode catalyst that comprises at least one transition metal and at least one chalcogen (e.g., sulfur, selenium, or tellurium). The at least one transition metal is selected from the group consisting of ruthenium, osmium, rhenium, rhodium, platinum, palladium, cobalt, nickel, chromium, molybdenum, iron, manganese, vanadium, tungsten, and combinations thereof. The cathode catalyst may comprise a support that includes at least one transition metal in elemental form capable of reducing oxygen and at least one chalcogen in solid elemental form disposed on the support (e.g., elemental selenium disposed on a ruthenium support). Alternatively, the cathode catalyst may comprise a transition metal chalcogenide (e.g., $RuSe_x$).

In one embodiment, substrate 120, 220, 320 is an ionomeric membrane such as, but not limited to poly (perfluorosulphonic acid) membranes, which are commercially available as Nafion®, Aciplex®, or Flemion®. MEA 205, 305 may additionally include a gas diffusion layer (not shown) comprising either carbon cloth or carbon paper.

In one embodiment, the at least one contaminant 115, 215, 315 is a metal oxide. The metal oxide is typically selected from the group consisting of oxides of ruthenium, iron, chromium, cobalt, molybdenum, manganese, magnesium, nickel, osmium, rhodium, tungsten, rhenium, yttrium, titanium, platinum, gold, iridium, and palladium.

Getter electrode 130, 230, 310 is a metal electrode comprising at least one of ruthenium, iron, chromium, cobalt, molybdenum, manganese, magnesium, nickel, osmium, rhodium, tungsten, rhenium, yttrium, titanium, platinum, gold, iridium, palladium, and combinations thereof. In one embodiment, getter electrode 130, 230, 330 comprises at least one of platinum, gold, iridium, palladium, and combinations thereof.

Figure 4:
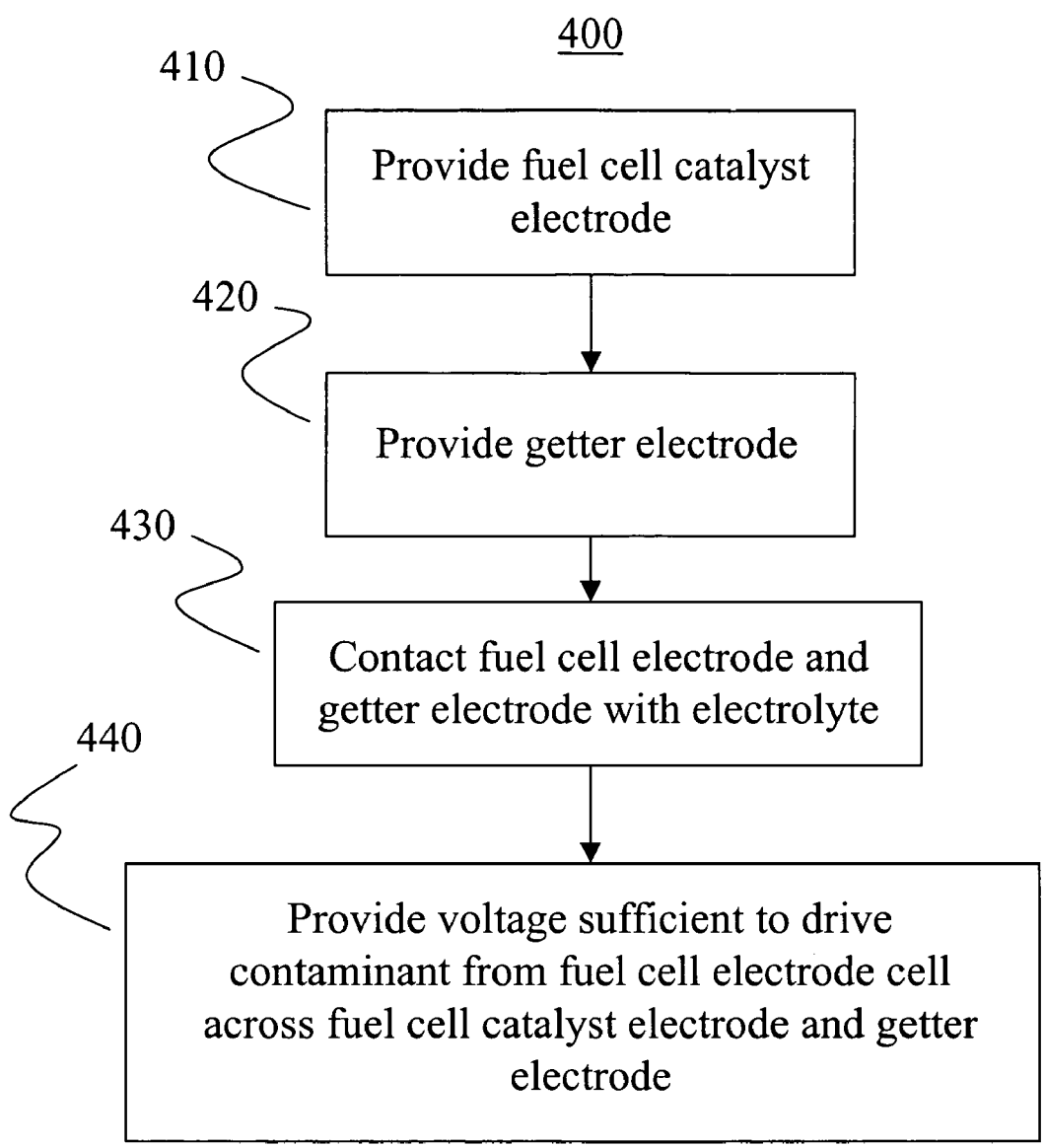
FIG. 4 is a flow chart for a method of removing at least one contaminant from a fuel cell catalyst.

The invention provides a method of removing at least one contaminant from a fuel cell catalyst. A flow chart outlining the steps of method 400 is shown in FIG. 4. In Step 410, a fuel cell catalyst electrode having at least one contaminant is provided. The fuel cell catalyst electrode may be provided to an electrolyte bath, as shown in FIG. 1, or brought into contact with a solid electrolyte, such as a PEM, as shown in FIGS. 2 and 3. A getter electrode is provided and electrically connected to the fuel cell catalyst electrode in Step 420. In Step 430, the getter electrode may be provided to an electrolyte bath, as shown in FIG. 1, or brought into contact with a solid electrolyte, such as a PEM, as shown in FIGS. 2 and 3. A voltage is provided across the fuel cell electrode and the getter electrode (Step 440). The voltage is sufficient to drive the at least one contaminant from fuel cell catalyst electrode through the electrolyte to the getter electrode, thereby removing at least a portion of the at least one contaminant from the fuel cell electrode catalyst electrode.

Figure 5:
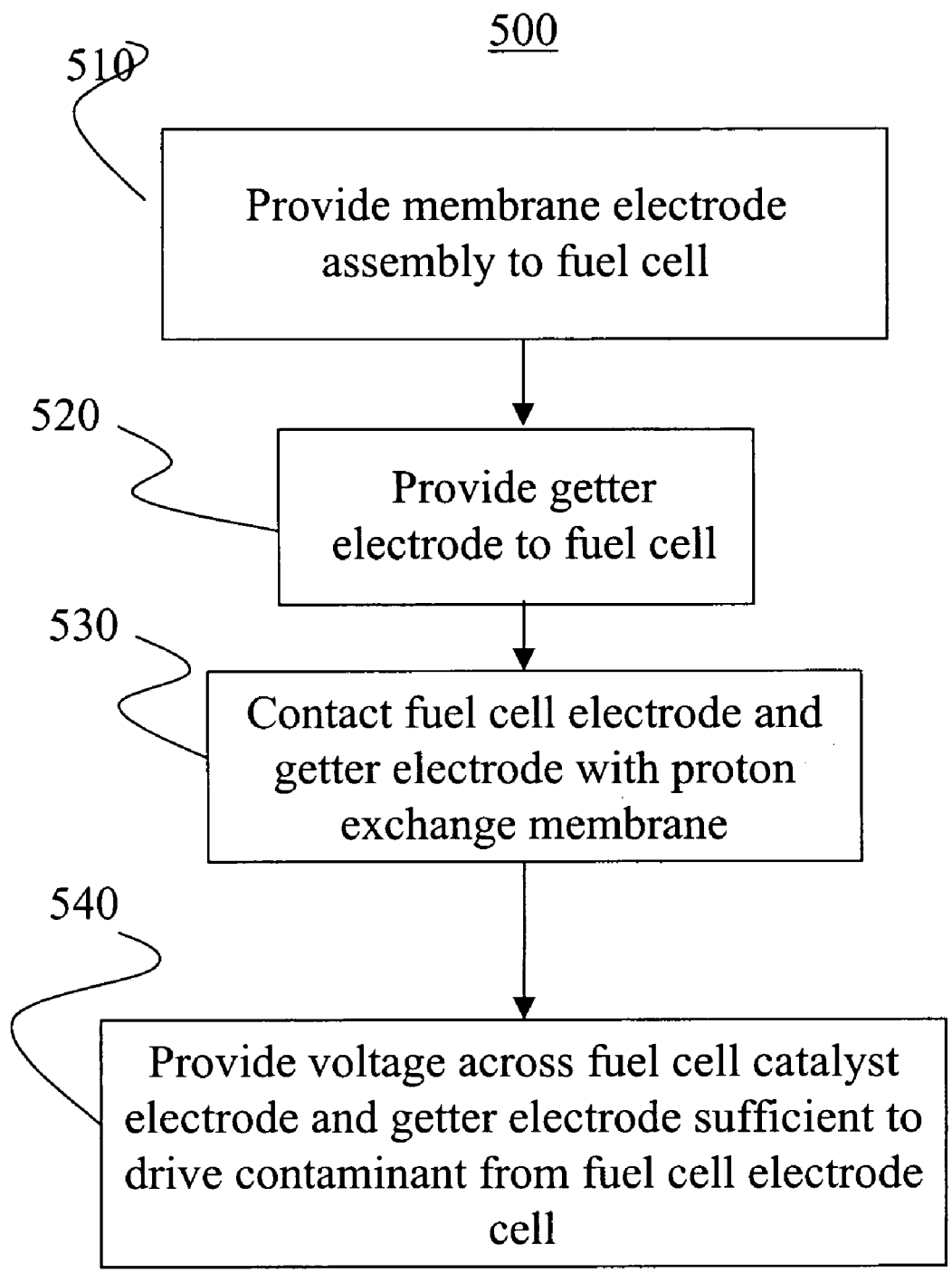
FIG. 5 is a flow chart for a method of removing at least one contaminant from a MEA.

A method of removing at least one contaminant from a membrane electrode assembly (MEA) of a fuel cell is also provided. FIG. 5 is a flow chart outlining the steps of method 500. First, a MEA comprising a fuel cell electrode, which is either an anode or a cathode, having at least one contaminant is provided to the fuel cell in Step 510. In Step 520, a getter electrode is provided to the fuel cell and electrically connected to the fuel cell electrode from which the at least one contaminant is to be removed. The fuel cell electrode and the getter electrode are brought into contact with a proton exchange membrane (Step 530), and a voltage is then provided between the getter electrode and the fuel cell electrode, driving the at least one contaminant from the fuel cell electrode to the getter electrode (Step 540). As previously described herein, where the at least one contaminant is to be removed from the fuel cell anode, the getter electrode is not a fuel cell catalyst electrode, but is instead either a disposable electrode, a removable electrode, or an electrode that can be otherwise be regenerated, as shown in FIGS. 2a and 2b. Where the at least one contaminant is to be removed from the fuel cell cathode, the fuel cell anode serves as the getter electrode, as shown in FIG. 3.

As previously described herein, the fuel cell catalyst electrode, in one embodiment, is a fuel cell anode. In this instance, the getter electrode is not a fuel cell catalyst electrode, but instead is one of a disposable electrode or an electrode that can be otherwise be regenerated. The getter electrode is replaced, if necessary or desired, at the end of the cleaning with an electrode free of accumulated contaminants. For example, the fuel cell catalyst electrode that is to be cleaned may be applied, by methods well known in the art, to a portion of the substrate to form a first half of a MEA. A second half of the MEA is formed by applying the getter electrode to a portion of a second substrate. The two halves are attached through the substrate surfaces that do not bear catalyst/electrode material to form a complete membrane electrode assembly. Following cleaning by either method 400 or method 500, the second half of the MEA, which includes the getter electrode (now containing the contaminant) of the MEA, may be removed and replaced by a half-MEA comprising an uncontaminated fuel cell electrode.

In those instances where the fuel cell catalyst electrode to be cleaned using the present methods is a fuel cell cathode and the getter electrode is the fuel cell anode, it is not necessary to replace the getter electrode.

By using methods 400, 500, the removal of mobile contaminants is carried out at a low potential (about 0.1 V) that is sufficient to permit selective migration of the contaminant to the "sacrificial" getter electrode. Removal of such contaminants improves electrode—and fuel cell—performance. Fuel cells in which contaminants have been removed from either the anode or cathode catalyst electrode by the methods described herein exhibit longer lifetimes, greater current densities, and greater output than similar catalyst electrodes that are not treated by these methods.

The following examples are intended to illustrate the features and advantages of the invention and in no way are intended to limit the invention thereto.

EXAMPLE 1

Selective Removal of Ru Oxides from Pt—Ru Anode Electrocatalyst

Membrane electrode assemblies were prepared by attaching two halves—i.e., membranes catalyzed on one side with either an anode catalyst or a cathode catalyst, with the other side left uncatalyzed—to form a complete MEA. All half-MEAs were prepared using Nafion® 1135 membranes, each having a thickness of about 90 μm, and standard catalyst inks. Unsupported Pt—Ru and Pt catalysts were applied each to Nafion® 1135 membrane using brush painting.

The standard anode ink composition was 86 wt % 1:1 Pt—Ru black (HiSPEC 6000, Johnson Matthey, Plc.) and 14 wt % Nafion® (1100 equivalent weight, Solution Technology, Inc.). The standard cathode ink composition was 90 wt % Pt black (HiSPEC 1000, Johnson Matthey, Plc.) and 10 wt % Nafion®. The catalyst inks were sonicated for about 90 seconds and then directly applied to pre-dried membrane by brush painting at 75° C. An ice bath was used to prevent overheating and minimize evaporation of solvents during painting. The anode and cathode catalyst loadings were approximately 10 mg/cm² and 6 mg/cm², respectively.

A reference MEA (i.e., not cleaned) was made by pressing together anode and cathode half-MEAs to form a complete MEA having the same thickness (about 180 µm) as a typical Nafion® 117 MEA. Single-side hydrophilic and double-sided hydrophobic carbon-cloth gas diffusion layers (E-TEK, Inc.), were used on the anode and cathode sides, respectively.

Using the methods described herein, oxide removal from the anode catalyst was carried out on another MEA at a potential of approximately 0.1 V against the fuel cell cathode (here serving as the getter electrode), which served as a quasi-reference/counter electrode, for five hours. High-purity nitrogen and hydrogen were flowed into the anode and cathode, respectively. After cleaning, the cathode half-MEA that served as the getter electrode was removed from the cell and replaced with a new cathode half-MEA.

Figure 6:
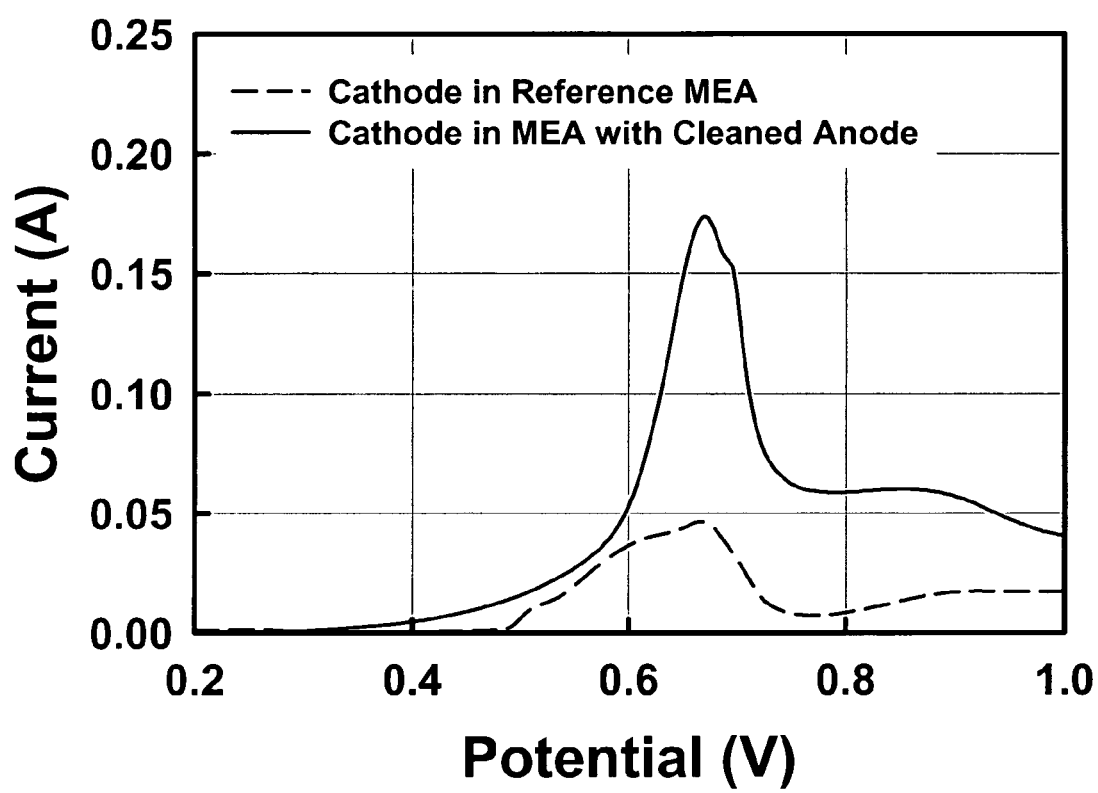
FIG. 6 is a plot of carbon monoxide stripping voltammograms obtained for a MEA having a standard cathode and a MEA having a cathode cleaned using the present methods.
Figure 7:
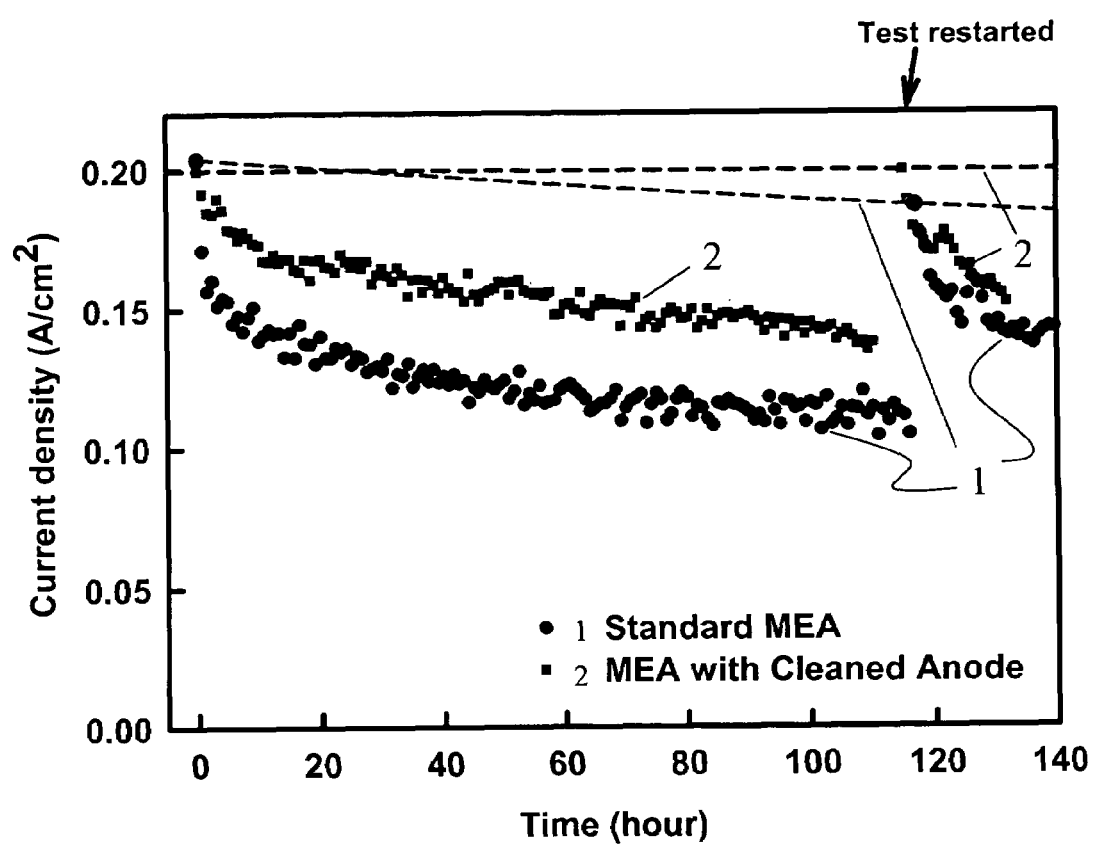
FIG. 7 is a plot of long term direct methanol fuel cell (DMFC) fuel cell performance of a MEA having a standard cathode and a MEA having a cathode that was cleaned using the present methods.

The performance of the MEA having the cleaned anode catalyst was compared to that of the reference MEA. FIG. 6 shows carbon monoxide stripping voltammograms recorded with the reference MEA cathode and with the cathode in the MEA in which the anode was cleaned using the method described herein. CO stripping from the cathode in the MEA having the cleaned anode gives rise to a narrower peak at a more positive potential than CO stripping from the reference MEA cathode. These differences are attributed to much more significant Ru crossover in the reference MEA cell. Results of life tests on the two MEAs, conducted at a constant voltage of 0.5 V at 80° C. for 130 hours, are shown in FIG. 7. The life tests were stopped after 115 hours of cell operation in order to obtain complete cell diagnostics. As expected for fuel cells having Pt cathodes, the current generated by both cells decreased over time due to gradual cathode oxidation. The initial current density of the MEA having the cleaned anode was comparable to that of the reference MEA (about 0.2 A/cm²). With increasing time, however, the MEA having the cleaned anode showed much less performance decay than the reference MEA. Furthermore, the initial performance of the MEA having the cleaned anode completely recovered after the diagnostics break, whereas the reference MEA anode suffered a noticeable performance loss of about 20 mA/cm².

Figure 8A:
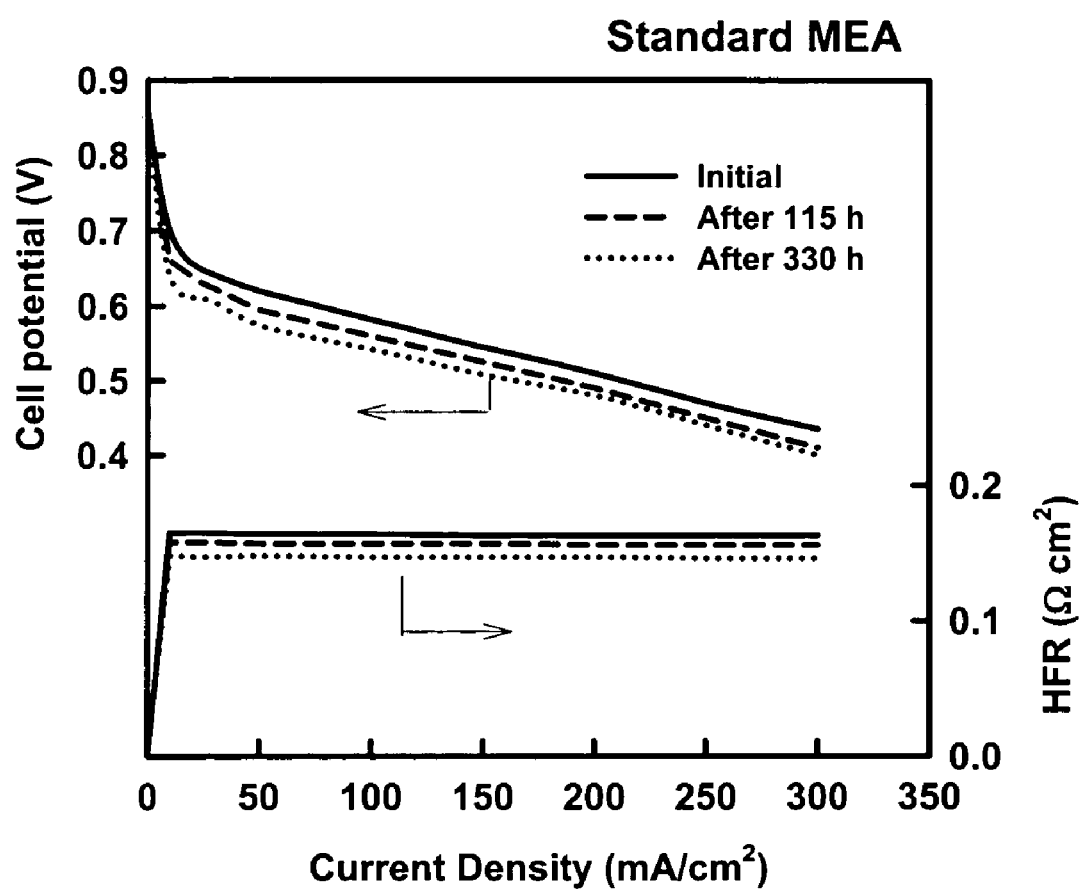
FIG. 8a is a plot of long term performance of a MEA having a standard cathode.
Figure 8B:
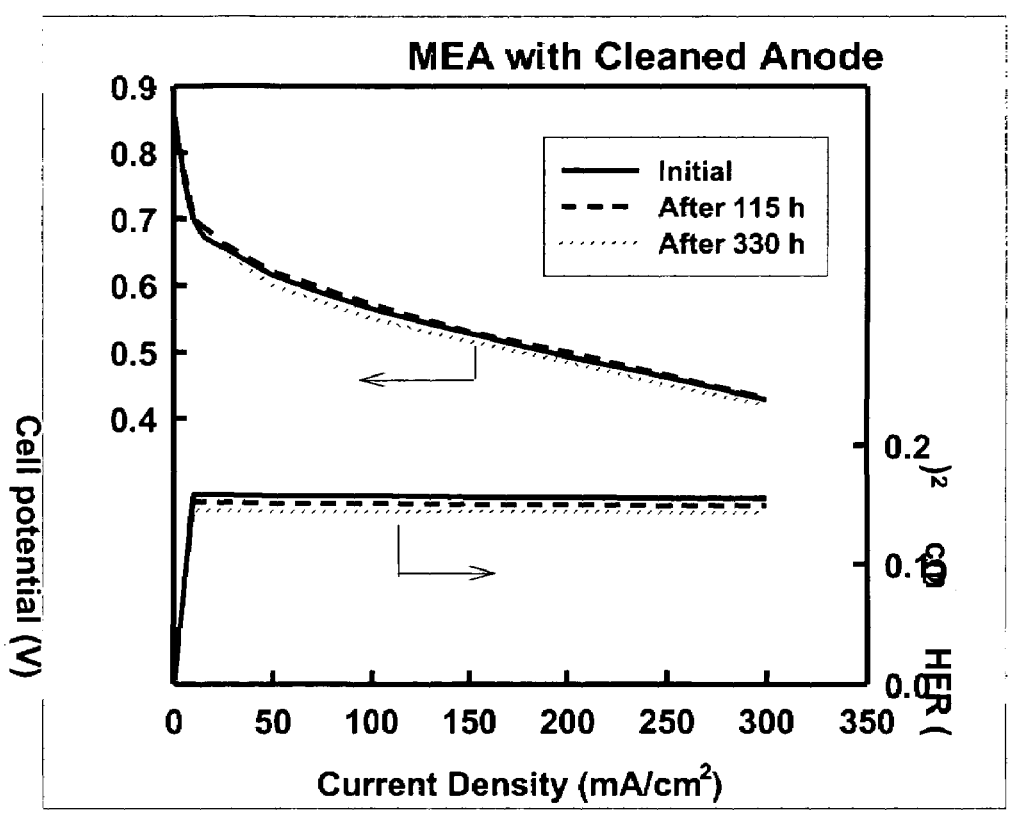
FIG. 8b is a plot of long term performance of a MEA having a cathode that was cleaned using the present methods.

FIGS. 8a and 8b summarize DMFC performance of the reference MEA and the MEA having the cleaned anode, respectively, after 115-hour and 330-hour life tests. Compared to the reference MEA, the MEA having the cleaned anode shows less performance loss.

EXAMPLE 2

Selective Removal of Oxide Impurity from Ru Cathode Electrocatalyst

MEAs having standard (i.e., not cleaned) ruthenium cathodes and MEAs having Ru cathodes that were cleaned using the methods described herein were prepared using Nafion® 1135 membranes and standard catalyst inks. Unsupported Pt and Ru catalysts were applied to each side of the membranes using brush painting.

The standard anode ink composition was 90 wt % Pt black (HiSPEC 1000, Johnson Matthey, Plc.) and 10 wt % Nafion® (1100 equivalent, Solution Technology, Inc.). The standard cathode ink composition was 83 wt % Ru black (Johnson Matthey, Plc) and 17 wt % Nafion®. Catalyst inks were sonicated for about 90 seconds and then applied to one side of a pre-dried membrane by brush painting. When the first electrode was complete, the membrane was turned over and the other side was painted. An ice bath was used to prevent overheating and minimize evaporation of solvents during the painting. The anode and cathode catalyst loadings were each approximately 6 mg/cm².

Single-sided hydrophilic and double-sided hydrophobic carbon-cloth GDLs (E-TEK, Inc.) were used on the anode and cathode sides of both MEAs, respectively. Cathode cleaning using the method described herein was carried out at a potential of approximately 0.10 V, measured against the fuel cell cathode (here serving as the getter electrode), which served as a quasi-reference/counter electrode, for five hours. Ultra-high purity hydrogen and nitrogen were flowed into the anode and cathode, respectively.

Figure 9:
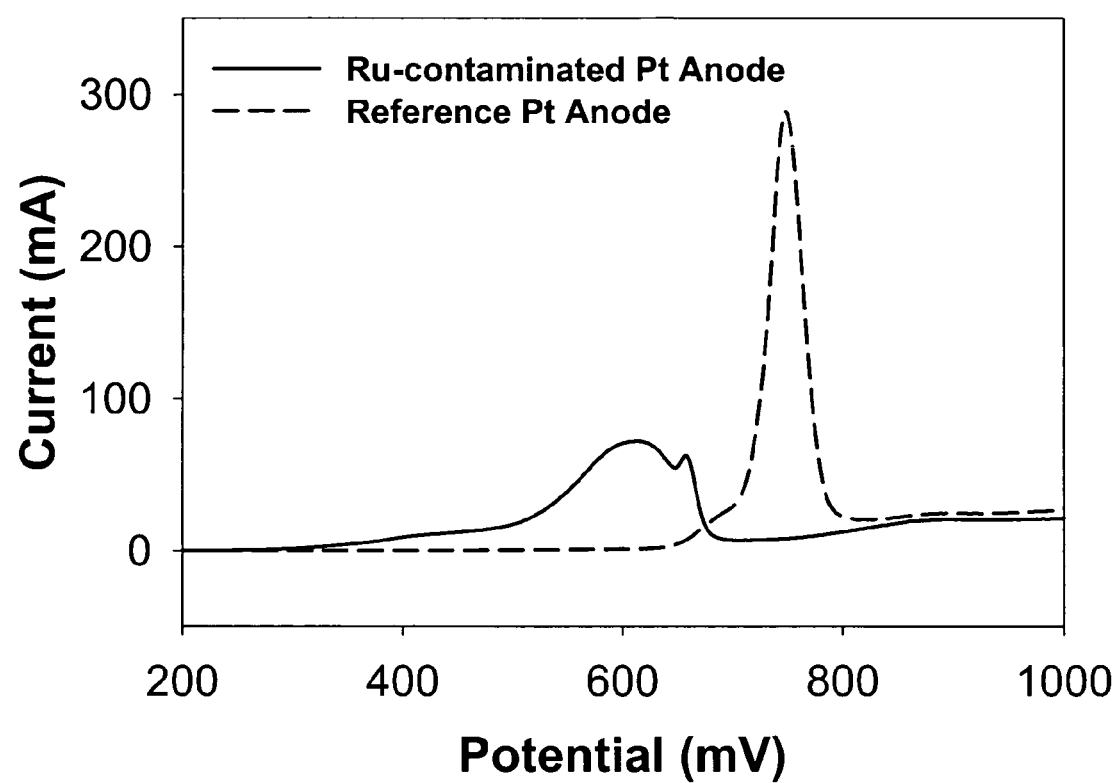
FIG. 9 is a plot of carbon monoxide stripping voltammogram obtained for a Pt cathode in a MEA having a ruthenium cathode that was cleaned using the present methods and for the cathode in a reference Pt—Pt MEA.

The performance of the MEA having the cleaned cathode catalyst was compared to the MEA having the standard Ru cathode. FIG. 9 shows CO stripping voltammograms obtained for a Pt cathode in the MEA having the cleaned Ru cathode and for the cathode in a reference Pt—Pt MEA (i.e., no Ru present). Comparison of the two voltammograms reveals a shift in the stripping peak potential in the cleaned MEA towards lower potentials and significant decrease in peak height. This shift in the stripping peak is evidence of the removal of oxide impurity—i.e., contaminant—from the Ru catalyst and its transfer across the membrane, followed by the formation of a Pt—Ru surface alloy at the anode. Because hydrogen oxidation is not significantly affected by Ru contamination of Pt catalysts, the anode that was used in the cleaning of the cathode does not need to be replaced with an uncontaminated anode.

Figure 10:
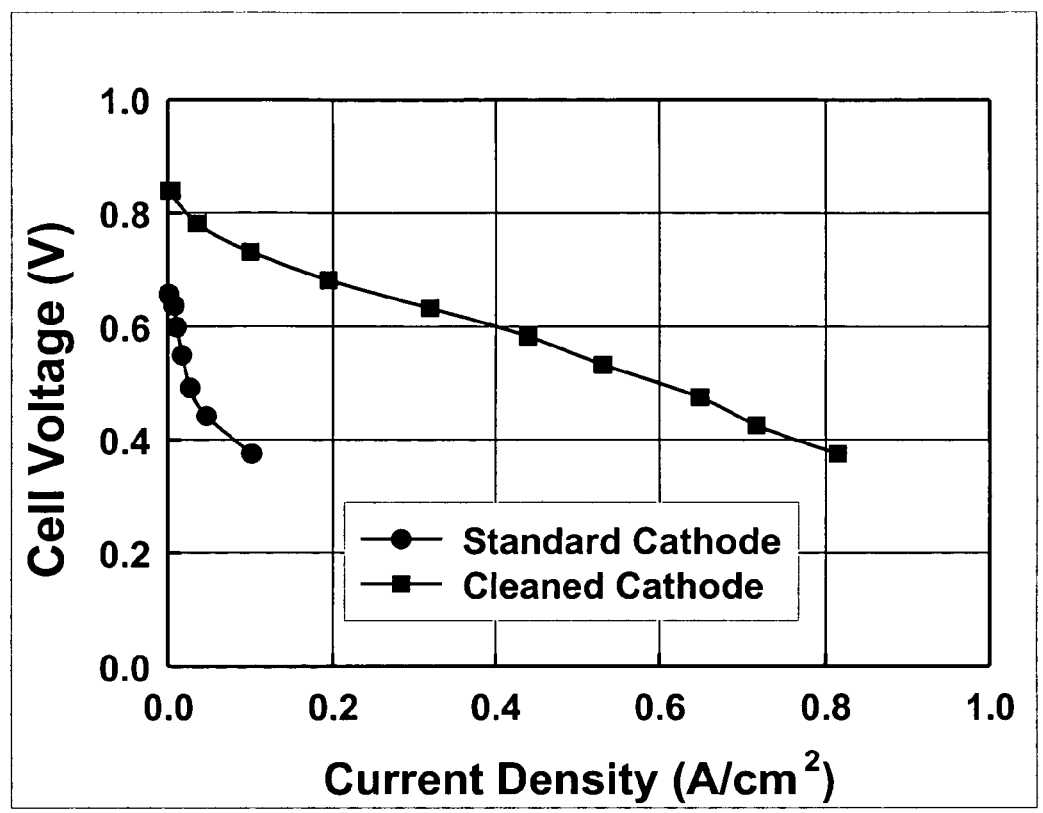
FIG. 10 is a plot of hydrogen-air polarization results obtained for a MEA having a standard cathode and a MEA having a ruthenium cathode that was cleaned using the present methods.

The benefits of a steady-state cleaning of catalysts are evident from the comparison of the two $H_2$-air polarization plots shown in FIG. 10. At 80° C., a standard MEA generates a maximum power density of 35 mW/cm², whereas the MEA having a cathode cleaned using the methods described herein generates a maximum power density of 308 mW/cm². Thus, the maximum power density is improved almost nine fold by using a MEA having a cathode cleaned by the present method.

Figure 11:
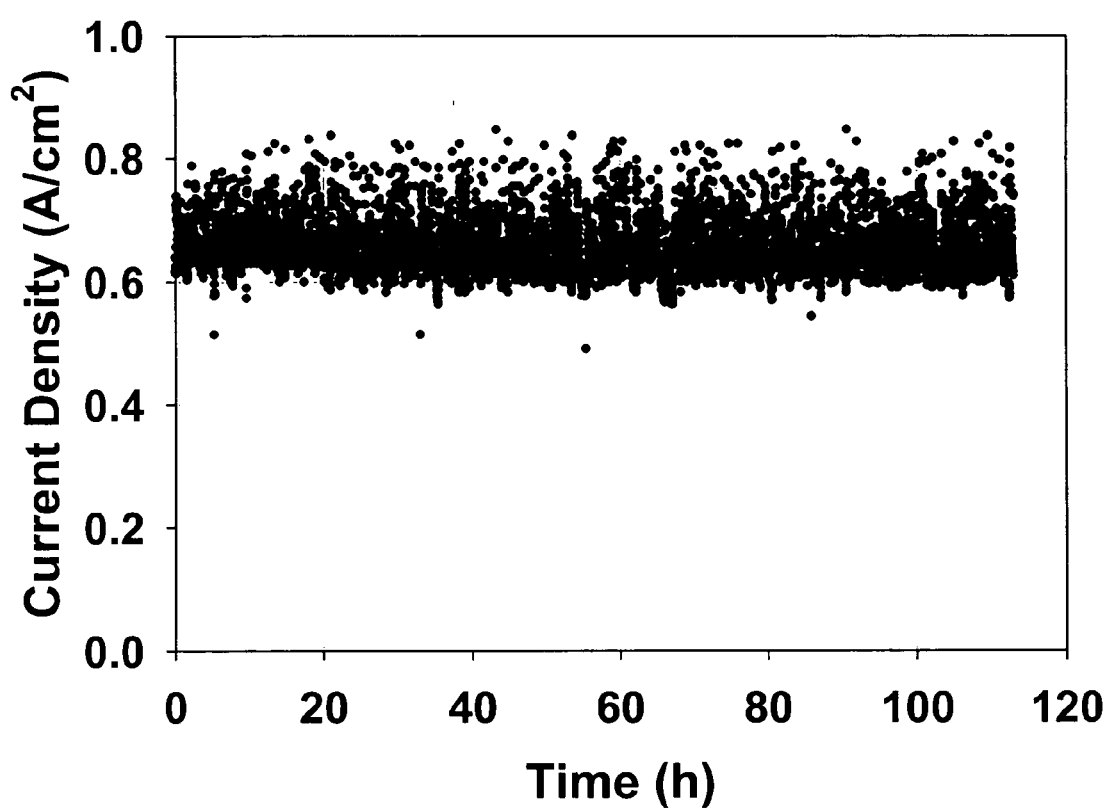
FIG. 11 is a plot of long term performance, obtained at 0.40 V and 80° C., of a MEA having a ruthenium cathode that was cleaned using the present methods.

Long-term $H_2$-air fuel cell performance for a MEA having a cleaned cathode is shown in FIG. 11. The MEA having a cleaned cathode shows no decline in current output during a 110-hour life test, thus indicating that the catalytic activity of the MEA with cleaned cathode is maintained for long cell operating times.

EXAMPLE 3

Selective Removal of Oxide Impurity from Ru—Se Cathode Electrocatalyst

MEAs with Pt—Ru anode black (HiSPEC 6000, Johnson Matthey, Plc) and Ru—Se black cathode were prepared using Nafion® 1135 membranes. The anode ink composition was 86 wt % Pt—Ru black and 14 wt % Nafion (1100 equivalent, Solution Technology, Inc.). The cathode ink composition was 83 wt % Ru—Se black and 17 wt % Nafion. The MEA fabrication procedure described in Example 2 was used to prepare the standard (i.e., not cleaned) MEA.

Figure 12:
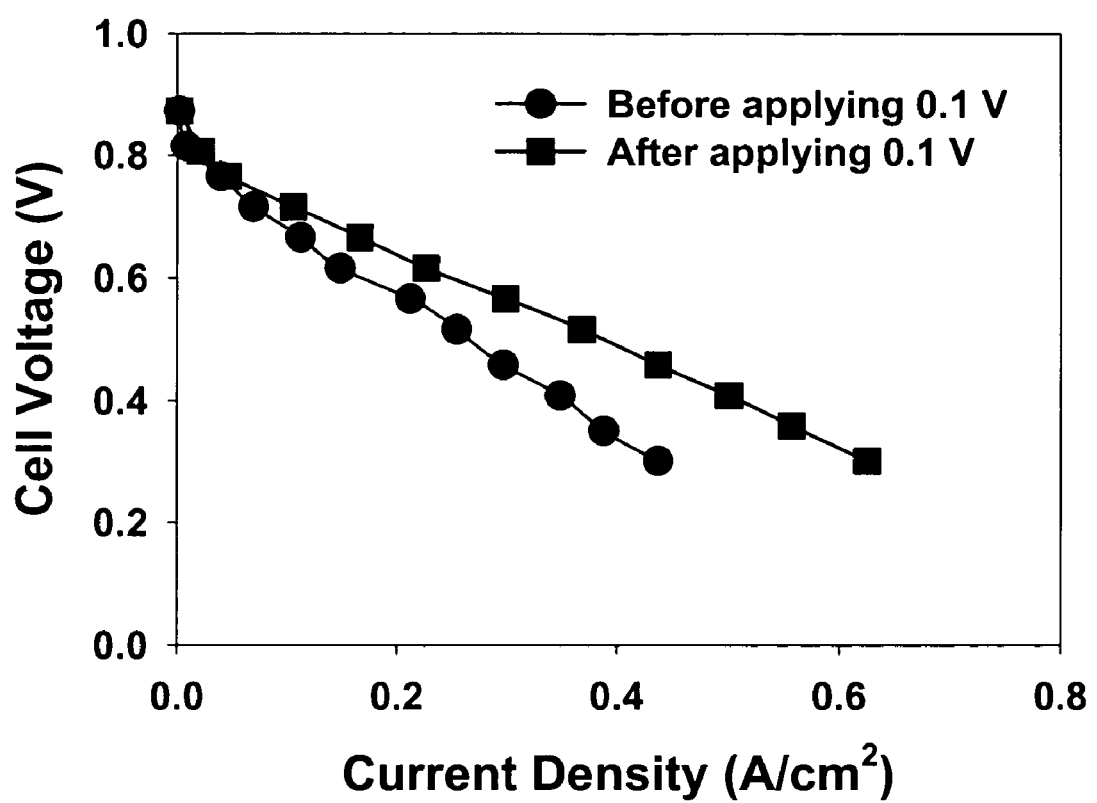
FIG. 12 is a plot of hydrogen-air polarization results obtained for a MEA having a standard ruthenium-selenium cathode and a MEA having a ruthenium-selenium cathode that was cleaned using the present methods.

Hydrogen/air fuel cell polarization curves obtained for a standard MEA (i.e., no cathode cleaning) and a MEA having a cathode cleaned using the present methods are compared in FIG. 12. The MEA having the cleaned cathode generates a maximum power density of 205 mW/cm², whereas the standard MEA generates a power density of 142 mW/cm². Thus, the MEA having a cathode that was cleaned using the methods described herein exhibits a 45% increase in performance over the standard MEA.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A method of removing at least one metal oxide contaminant from a fuel cell catalyst electrode, the method comprising the steps of:
   a. providing the fuel cell catalyst electrode, the fuel cell catalyst electrode including the at least one metal oxide contaminant;
   b. providing a removeable getter electrode, wherein the getter electrode is electrically connected to the fuel cell electrode;
   c. contacting the fuel cell catalyst electrode and the getter electrode with an electrolyte;
   d. providing a voltage across the fuel cell electrode and the getter electrode, wherein the voltage is sufficient to drive the at least one metal oxide contaminant from the fuel cell electrode through the electrolyte to the getter electrode, thereby removing the at least one contaminant from the fuel cell electrode.

2. The method according to claim 1, wherein the electrolyte is one of an aqueous bath and an ionic bath.

3. The method according to claim 1, wherein the electrolyte is a proton exchange membrane.

4. The method according to claim 3, wherein the fuel cell catalyst electrode is a fuel cell cathode.

5. The method according to claim 4, wherein the getter electrode is a fuel cell anode.

6. The method according to claim 1, wherein the fuel cell catalyst electrode is the fuel cell anode, and wherein the getter electrode is a removable getter electrode other than the cathode.

7. The method according to claim 3, wherein the fuel cell is a polymer electrolyte fuel cell.

8. The method according to claim 7, wherein the polymer electrolyte fuel cell is a direct methanol fuel cell.

9. The method according to claim 1, wherein the getter electrode comprises at least one of ruthenium, iron, chromium, cobalt, molybdenum, manganese, magnesium, nickel, osmium, rhodium, tungsten, rhenium, yttrium, titanium, platinum, gold, iridium, palladium, and combinations thereof.

10. The method according to claim 9, wherein the getter electrode comprises at least one of platinum, gold, iridium, palladium, and combinations thereof.

11. The method according to claim 1, wherein the fuel cell catalyst electrode comprises one of a platinum alloy, a transition metal, and a cathode catalyst comprising at least one transition metal and at least one chalcogen.

12. The method according to claim 11, wherein the at least one transition metal is selected from the group consisting of ruthenium, iron, chromium, cobalt, molybdenum, manganese, magnesium, nickel, osmium, rhodium, tungsten, rhenium, yttrium, titanium, and combinations thereof.

13. The method according to claim 11, wherein the cathode catalyst comprises least one transition metal in elemental form capable of reducing oxygen and at least one chalcogen in elemental form disposed on at least a portion of a surface of the transition metal.

14. The method according to claim 1, wherein the metal oxide is an oxide of a metal selected from the group consisting of ruthenium, iron, chromium, cobalt, molybdenum, manganese, magnesium, nickel, osmium, rhodium, tungsten, rhenium, yttrium, titanium, platinum, gold, iridium, and palladium.

15. A method of removing at least one metal oxide contaminant from a membrane electrode assembly of a fuel cell in situ, the method comprising the steps of:
   a. providing a membrane electrode assembly to the fuel cell, the membrane electrode assembly comprising a fuel cell electrode, the fuel cell electrode comprising the at least one metal oxide contaminant and one of a platinum alloy, at least one transition metal, and a cathode catalyst comprising at least one transition metal and at least one chalcogen;
   b. providing a removeable getter electrode to the fuel cell, wherein the getter electrode is electrically connected to the fuel cell electrode;
   c. contacting the fuel cell electrode and the getter electrode with a proton exchange membrane; and
   d. providing a voltage across the fuel cell electrode and the getter electrode, wherein the voltage is sufficient to drive the at least one metal oxide contaminant from the fuel cell electrode through the proton exchange membrane to the getter electrode, thereby removing the at least one contaminant from the fuel cell electrode.

16. The method according to claim 15, wherein the fuel cell electrode is the cathode.

17. The method according to claim 16, wherein the getter electrode is the getter electrode is the anode.

18. The method according to claim 15, wherein the fuel cell electrode is the anode, and wherein the getter electrode is a removable getter electrode other than the cathode.

19. The method according to claim 15, wherein the fuel cell is a polymer electrolyte fuel cell.

20. The method according to claim 15, wherein the polymer electrolyte fuel cell is one of a direct methanol fuel cell.

21. The method according to claim 15, wherein the getter electrode comprises at least one of ruthenium, iron, chromium, cobalt, molybdenum, manganese, magnesium, nickel, osmium, rhodium, tungsten, rhenium, yttrium, titanium, platinum, gold, iridium, palladium, and combinations thereof.

22. The method according to claim 21, wherein the getter electrode comprises at least one of platinum, gold, iridium, palladium, and combinations thereof.

23. The method according to claim 15, wherein the platinum alloy is selected form the group consisting of platinum/ruthenium alloys, platinum/nickel alloys, platinum/chromium alloys, and combinations thereof.

24. The method according to claim 15, wherein the at least one transition metal is selected from the group consisting of ruthenium, iron, chromium, cobalt, molybdenum, manganese, magnesium, nickel, osmium, rhodium, tungsten, rhenium, yttrium, titanium, and combinations thereof.

25. The method according to claim 15, wherein the cathode catalyst comprises least one transition metal in elemental form capable of reducing oxygen and at least one chalcogen in elemental form disposed on at least a portion of a surface of the transition metal.

26. The method according to claim 15, wherein the metal oxide is an oxide of a metal selected from the group consisting of ruthenium, iron, chromium, cobalt, molybdenum, manganese, magnesium, nickel, osmium, rhodium, tungsten, rhenium, yttrium, titanium, platinum, gold, iridium, and palladium.

27. A method of improving fuel cell performance, the method comprising the steps of:
- a. providing a membrane electrode assembly to the fuel cell, the memhrane electrode assembly comprising a fuel cell electrode, the fuel cell electrode comprising the at least one metal oxide contaminant and one of a platinum alloy, at least one transition metal, and a cathode catalyst comprising at least one transition metal and at least one chalcogen;
- b. providing a removeable getter electrode to the fuel cell, wherein the getter electrode is electrically connected to the fuel cell electrode;
- c. contacting the fuel cell electrode and the getter electrode with a proton exchange membrane; and
- d. providing a voltage across the fuel cell electrode and the getter electrode, wherein the voltage is sufficient to drive the at least one metal oxide contaminant from the fuel cell electrode to the getter electrode, thereby removing the at least one metal oxide contaminant from the fuel cell electrode, and wherein removing the at least one metal oxide contaminant from the fuel cell electrode improves fuel cell performance.

* * * * *